United States Patent

O'Brien et al.

[11] 3,925,385
[45] Dec. 9, 1975

[54] 6-CARBETHOXY-3,7-DISUBSTITUTED-PYRAZOLO[1,5A]PYRIMIDINES

[75] Inventors: Darrell E. O'Brien, Mission Viejo; Roland K. Robins; Robert H. Springer, both of Santa Ana, all of Calif.

[73] Assignee: ICN Pharmaceuticals, Inc., Irvine, Calif.

[22] Filed: Apr. 20, 1972

[21] Appl. No.: 245,870

[52] U.S. Cl. 260/256.4 F; 260/256.5 R; 260/310 R; 260/465.4; 260/484; 424/251
[51] Int. Cl.² .................................. C07D 487/04
[58] Field of Search............. 260/256.4 F, 256.5 R

[56] References Cited
UNITED STATES PATENTS
3,048,587  8/1962  Oroshnik .................... 260/256.4

OTHER PUBLICATIONS
Makisumi et al.–C.A. 59, 8764d–g (1963).
Makisumi–C.A. 59, 8764e (1963)–Abstract of Japanese Patent No. 7982/62.

Primary Examiner—Raymond V. Rush
Attorney, Agent, or Firm—William E. Thompson, Jr.; William C. Steffin; Kay H. Boswell

[57] ABSTRACT

Pyrazolo[1,5a]pyrimidines of the following general structure are disclosed which are useful as inhibitors of phosphodiesterase enzymes,

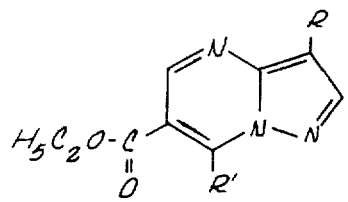

wherein R and R' are the substituents defined hereinafter. Such compounds may be prepared by condensation of 3-aminopyrazole with diethyl ethoxymethylenemalonate to afford 6-carbethoxy-7-hydroxypyrazolo[1,5a]pyrimidine which, when heated with phosphorous oxychloride under appropriate conditions, gives 6-carbethoxy-7-chloropyrazolo[1,5a]pyrimidines, which, when treated with nucleophilic reagents produce 6-carbethoxy-7-substitutedpyrazolo[1,5a]pyrimidines. The treatment of 6-carbethoxy-7-substitutedpyrazolo[1,5a]pyrimidines with electrophilic reagents produces the corresponding 3,7-disubstituted-6-carbethoxypyrazolo[1,5a]pyrimidines. Condensation of various 4-substituted-3-aminopyrazoles with ethyl ethoxymethylenecyanoacetate affords 6-carbethoxy-7-amino-3-substitutedpyrazolo[1,5a]pyrimidines.

3 Claims, No Drawings

6-CARBETHOXY-3,7-DISUBSTITUTED-PYRAZOLO[1,5A]PYRIMIDINES

BACKGROUND OF THE INVENTION

As reported by Sutherland et al. in "Cyclic AMP", Am. Rev. Biochem. 37, 149 (1968), cyclic adenosine monophosphate (C-AMP) has been established as an intracellular "second messenger", mediating many of the actions of a variety of different hormones. According to this theory, first messenger hormones, epinephrine and norepinephrine, influence adenyl cyclase contained at or within cell walls to form intracellular cyclic AMP from adenosine triphosphate upon receipt of the extra-cellular hormone signal. The formed cyclic AMP in turn functions as a second messenger and stimulates intracellular functions particular to the target cells of the hormone. Cyclic AMP has thus been shown to "activate" protein kinases, which in turn produce physiological effects such as muscle contraction, glycogenolysis, steroidogenisis and lipolysis.

Cyclic AMP is degraded, however, in vivo by phosphodiestearate enzymes, which catalyze hydrolysis of the cyclic purine nucleotide to 5'-adenosine monophosphate with a consequent loss of function. It has accordingly been suggested that substituted cyclic AMP analogs which are more resistant to phosphodiesterase degradation than the naturally occurring cyclic nucleotide might be administered in aid of lagging cellular processes. Synthetic production of such compounds, however, is quite costly. It would be advantageous, therefore, to enhance the beneficial effects of naturally produced cyclic AMP by administering compounds which are capable of selectively inhibiting tissue specific phosphodiesterase enzymes.

Sutherland et al., in Circulation 37, 279 (1968), suggest that the pharmacological effects of theophylline, which has the structure

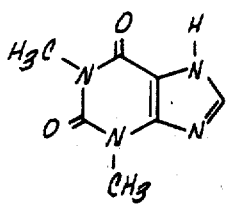

are the result of its ability to inhibit the action of phosphodiesterase enzymes. Theophylline has thus been employed in lieu of the adenyl cyclase-stimulating hormones, epinephrine and norepinephrine, as a heart stimulant following cardiac arrest and in refractory asthma cases as a bronchial dilator. Theophylline, however, does not selectively inhibit phosphodiesterase, but rather gives general stimulation to the central nervous system. Accordingly, the use of theophylline can make the recipient nervous and irritable and can also create cardiovascular effects, i.e, rapid beating. By the same token, theophylline is not as potent as a phosphodiesterase inhibitor as is desired and consequently has to be used in large quantities, which, of course, can further the undesirable effects enumerated above.

As indicated in the application of Darrell E. O'Brien et al., Ser. No. 206,538, entitled "3,5,7-trisubstituted-pyrazolo[1,5a]pyrimidines", assigned to the same assignee as this application, various 5,7-dialkyl- and 5-alkyl-3,7-disubstitutedpyrazolo[1,5a]pyrimidines have been found to possess phosphodiesterase inhibition properties. Further evaluation of such compounds has shown that 3-bromo-5,7-dimethylpyrazolo[1,5a]-pyrimidine not only is significantly more active than theophylline against various phosphodiesterase enzymes, but also has the ability to produce a positive inotropic effect in an anesthetized dog, which has accordingly led to the investigation of additional derivatives of such pyrazolo[1,5a]pyrimidine ring system.

SUMMARY OF THE INVENTION

According to this invention, phosphodiesterase inhibitors of the following structure are provided

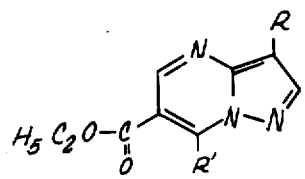

wherein R is a halogen; hydrogen; cyano; nitro; amino; sulfonic acid; sulfonamido; carbamoyl; acetyl; acetamido; or $NHR_1$ or $N(R_1)_2$ where $R_1$ is a $C_1$–$C_6$ alkyl; and R' is OH; amino; halogen; alkoxy; SH; $SR_1$, $NHR_1$ or $N(R_1)_2$ where $R_1$ is a $C_1$–$C_6$ alkyl; or $NHN(CH_3)_2$; $NH(CH_2)_nOH$ or $NH(CH_2)_nCOOH$ where n is an integer of from 1 to 6. When R' is OH or amino, however, R is a member of the indicated group other than hydrogen.

DETAILED DESCRIPTION OF THE INVENTION

The general procedure utilized to produce the compounds of this invention is shown by the schematic drawing which follows, the various compounds being indicated by the numbers 1 through 29 inclusive. Following the procedure reported by Y. Makisumi, Chem. and Pharm. Bull (Tokyo), 10, 620 (1962), 3-aminopyrazole (compound 1) was condensed with diethyl ethoxymethylenemalonate in acetic acid solution to obtain 6-carbethoxy-7-hydroxypyrazolo[1,5a] pyrimidine (compound 5). Analogously, condensation of 3-amino-4-carbethoxypyrazole (compound 2) and 3-amino-4-bromopyrazole (compound 3) with diethyl ethoxymethylene malonate yields 3,6-bis(carbethoxyl)-7-hydroxypyrazolo[1,5a]pyrimidine (compound 6) and 3-bromo-6-carbethoxy-7-hydroxypyrazolo[1,5a]pyrimidine (compound 7) respectively. Also following the procedure of Y. Makisumi, supra, condensation of 3-aminopyrazole with ethyl ethoxymethylenecyanoacetate affords 7-amino-6-carbethoxy-pyrazolo[1,5a]pyrimidine (compound 8). By the same type of condensation of compounds 2 and 3 and 3-amino-4-nitropyrazole (compound 4) in acetic acid solution yields 7-amino-3,6-bis(carbethoxy)pyrazolo[1,5a]pyrimidine (compound 9), 7-amino-3-bromo-6-carbethoxypyrazolo[1,5a]pyrimidine (compound 10), and 7-amino-6-carbethoxy-3-nitropyrazolo[1,5a]pyrimidine (compound 11) respectively.

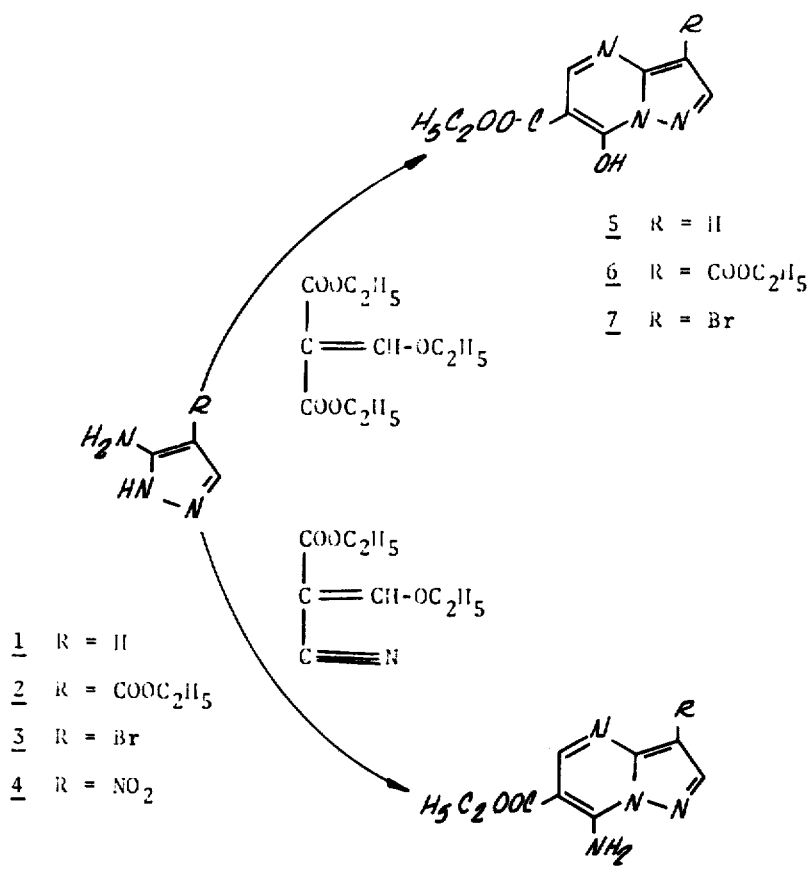

- 1  R = H
- 2  R = COOC$_2$H$_5$
- 3  R = Br
- 4  R = NO$_2$

- 5  R = H
- 6  R = COOC$_2$H$_5$
- 7  R = Br

- 8  R = H
- 9  R = COOC$_2$H$_5$
- 10 R = Br
- 11 R = NO$_2$

Compound 5, when heated with phosphorus oxychloride in the presence of N,N-diethylaniline affords 6-carbethoxy-7-chloropyrazolo[1,5a]pyrimidine (compound 12). The chloro moiety of compound 12 is quite reactive toward nucleophilic displacement reactions, and a solution of sodium-n-propoxide in n-propanol at 35° Centigrade converts compound 12 into 6-carbethoxy-7-n-propoxypyrazolo[1,5a]pyrimidine (compound 13). Analogously, treatment of compound 12 with primary and secondary amines in ethanol affords the 6-carbethoxy-7-substitutedaminopyrazolo[1,5a]-pyrimidine derivatives (compounds 14 – 19). Treatment of compound 12 with an ethanolic solution of thiourea affords 6-carbethoxy-7-mercaptopyrazolo[1,5a]pyrimidine (compound 20), and a solution of sodium ethylmercaptide in methanol readily converts compound 12 to 6-carbethoxy-7-ethylthiopyrazolo [1,5a]pyrimidine (compound 21). Bromination of 6-carbethoxy-7-propoxypyrazolo[1,5a]pyrimidine (compound 13), 6-carbethoxy-7-ethylthiopyrazolo[1,5a]-pyrimidine (compound 21) and the 6-carbethoxy-7-substitutedaminopyrazolo[1,5a] pyrimidines (compounds 14 – 19) with bromine in glacial acetic acid containing sodium acetate yields the corresponding 3-bromo derivatives (compounds 22 – 29).

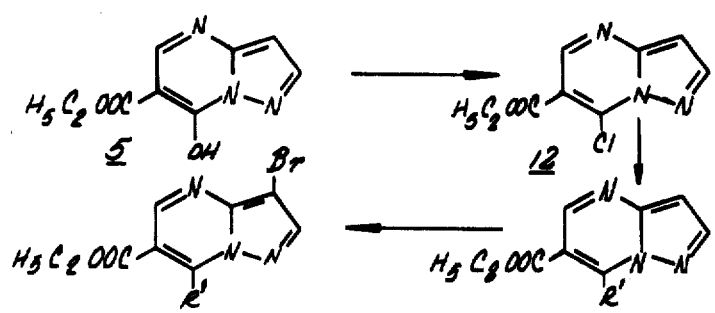

| | |
|---|---|
| 22 R' = O-CH$_2$-CH$_2$-CH$_3$ | 13 R' = OCH$_2$-CH$_2$-CH$_3$ |
| 23 R' = NH-CH$_2$-CH$_3$ | 14 R' = NH-CH$_2$-CH$_3$ |
| 24 R' = NH-CH$_2$-CH$_2$-CH$_3$ | 15 R' = NH-CH$_2$-CH$_2$-CH$_3$ |
| 25 R' = N(CH$_3$-CH$_3$)$_2$ | 16 R' = N(CH$_2$-CH$_3$)$_2$ |
| 26 R' = NH-CH$_2$-CH$_2$OH | 17 R' = NH-CH$_2$-CH$_2$-OH |
| 27 R' = NH-CH$_2$-COOH | 18 R' = NH-CH$_2$-COOH |
| 28 R' = NHN(CH$_3$)$_2$ | 19 R' = NH-N(CH$_3$)$_2$ |
| 29 R' = S-CH$_2$-CH$_3$ | 20 R' = SH |
| | 21 R' = S-CH$_2$-CH$_3$ |

The invention will be further understood by reference to the specific but illustrative examples which follow. In all such examples, parts and percentages are by weight and temperatures are in degrees Centigrade unless otherwise indicated. Melting points were taken on a Thomas-Hoover melting point apparatus and are uncorrected. All samples displayed a single spot on thin layer chromatography and were analyzed by the Heterocyclic Chemical Corporation of Harrisonville, Missouri. Where analyses are indicated only by symbols of the elements or functions, analytical results obtained for those elements or functions were with in ± 0.4% of the theoretical values.

EXAMPLE I

Preparation of
6-Carbethoxy-7-hydroxy-3-Substitutedpyrazolo[1,5a]-pyrimidines (compounds 5 – 7)

A solution of diethyl ethoxymethylenemalonate[4.01 g (18.5 mmoles)] and 3-amino-4-substitutedpyrazole[18.5 mmoles] in 25 ml of glacial acetic acid was heated at reflux with stirring for 2 hours. At the end of this time, the acetic acid solution was evaporated to dryness at reduced pressure. The residue was washed well with water and then purified by recrystallization from aqueous ethanol to afford the analytically pure products listed in the table.

EXAMPLE II

Preparation of
7-Amino-6-carbethoxypyrazolo[1,5-a]pyrimidines (compounds 8 – 11)

A solution of ethyl ethoxymethylenecyanoacetate[3.15 g (18.5 mmoles)] and 3-amino-4-substitutedpyrazoles[18.5 mmoles] in 25 ml of glacial acetic acid was heated at reflux with stirring for 2 hours. At the end of this time, the acetic acid solution was evaporated to dryness at reduced pressure, and the residue washed with water. Recrystallization of the crude products from aqueous ethanol afforded the analytically pure products that are listed in the table.

EXAMPLE III

Preparation of
6-Carbethoxy-7-chloropyrazolo[1,5a]pyrimidine (compound 12)

A mixture of 6-carbethoxy-7-hydroxypyrazolo[1,5a]pyrimidine (compound 5) [42 g(0.203 moles)], N,N-diethylaniline (55 ml), and phosphorus oxychloride (500 ml) was stirred and heated to reflux. After refluxing 3 hours, the excess phosphorus oxychloride was removed by distillation at reduced pressure. The syrup residue was added to 1 kg of crushed ice with good stirring. The resulting cold aqueous solution was extracted with ether 3 (250 ml), and the combined ethereal extracts were washed with saturated sodium bicarbonate solution 2 (100 ml) and then with water 2 (100 ml) and dried over anhydrous sodium sulfate. Evaporation of the ether solution afforded 29 g (63%) of 6-carbethoxy-7-chloropyrazolo[1,5a]pyrimidine (compound 12) that had a melting point of 83°–5°. Recrystallization of this product from n-heptane afforded an analytical sample of this product (see table).

EXAMPLE IV

Preparation of
6-Carbethoxy-7-n-propoxypyrazolo[1,5a]pyrimidine (compound 13)

A solution of sodium n-propoxide in n-propanol was prepared by dissolving sodium metal [1.02 g (0.044 formula weights)] in 200 ml of n-propanol. With good stirring, 6-carbethoxy-7-chloropyrazolo[1,5a]pyrimidine (compound 12) [10.0 g (44.4 mmoles)] was added to the sodium n-propoxide solution. The resulting solution was warmed at 35° for 2 hours, and then evaporated to dryness at 35° under reduced pressure. The residue was washed with water and then recrystallized from aqueous ethanol to afford an analytically pure product (see table).

EXAMPLE V

Preparation of
6-Carbethoxy-7-Substitutedaminopyrazolo[1,5a]-Pyrimidines (compounds 14 – 17, 19)

A solution of 6-carbethoxy-7-chloropyrazolo[1,5a]-pyrimidine (compound 12) [4.0 g (17.5 mmoles)] and substituedamine (35.0 mmoles) in 40 ml of absolute ethanol was stirred and warmed to 50°–55°. This solution was stirred for 2 hours and then diluted with 100 ml of water. The resulting solution was chilled overnight and the crude 6-carbethoxy-7-substitutedaminopyrazolo[1,5a]pyrimidines were separated by filtration. These products were purified by recrystallization from aqueous ethanol to afford the analytically pure products listed in the table.

EXAMPLE VI

Preparation of
N-(6-Carbethoxypyrazolo[1,5a]pyrimidine-7-yl)glycine (compound 18)

A mixture of 6-carbethoxy-7-chloropyrazolo[1,5a]-pyrimidine (compound 12) [2.25 g (10 mmoles)], glycine [1.5 g (20 mmoles)], and sodium carbonate [1.06 g (10 mmoles)] in 50 ml of water was stirred and heated at reflux for 2 hours. At the end of this time, the solution was cooled and acidified with formic acid. The crude product was separated by filtration, washed with water, and purified by recrystallizing from a mixture of DMF and water (see table).

EXAMPLE VII

Preparation of
6-Carbethoxy-7-mercaptopyrazolo[1,5a]pyrimidine (compound 20)

A mixture of 6-carbethoxy-7-chloropyrazolo[1,5a]-pyrimidine (compound 12) [5.50 g (20 mmoles)] and thiourea [1.67 g (22 mmoles)] in 75 ml of absolute ethanol was stirred and heated at reflux for 2 hours. At the end of this time the mixture was cooled and the solid separated by filtration. The solid was dissolved in a minimum amount of diluted sodium hydroxide solution (0.1 N), treated with decolorizing carbon, and filtered. The pH of the filtrate was adjusted to 1 by the addition of 6 N hydrochloric acid. The precipitated product was separated by filtration, washed with water, and then recrystallized from water to afford the analytically pure product that is listed in the table.

EXAMPLE VIII

Preparation of 6-Carbethoxy-7-ethylthiopyrazolo[1,5a]pyrimidine (compound 21)

A solution of sodium methylate in methanol was prepared by dissolving sodium [0.23 g (0.01 formula weights)] in 20 ml of absolute methanol. Ethanethiol [0.7 g (11.3 mmoles)] was added to the sodium methylate solution with good stirring. The resultant solution was stirred at room temperature for 15 minutes, and then 6-carbethoxy-7-chloropyrazol[1,5a]pyrimidine (compound 12) [2.25 g (10 mmoles)] was added to the solution. This solution was stirred at room temperature for 15 minutes, heated at 45° for 15 minutes, and then evaporated to dryness. The residue was recrystallized from n-heptane to yield the analytically pure product that is listed in the table.

EXAMPLE IX

Preparation of 3Bromo-6-carbethoxy-7-substituted pyrazolo[1,5a]pyrimidines (compounds 22 – 29)

A solution of 6-carbethoxy-7-substitutedpyrazolo[1-,5a]pyrimidine (10 mmoles) and sodium acetate [2,47 g (0.03 formula weights)] in 25 ml of glacial acetic acid was stirred at room temperature while a solution of bromine [1.60 g (0.01 formula weights)] in 10 ml of glacial acetic acid was added dropwise. After the addition was complete, the solution was stirred at room temperature for 1 hour and then added to 150 ml of water. The resultant mixture was chilled overnight and the crude 3-bromo derivatives (compounds 22 – 29) were separated by filtration, washed with water, and recrystallized from aqueous ethanol to afford the analytically pure products listed in the table.

EXAMPLE X

The compounds of this invention have been tested for their ability to inhibit action of the enzyme phosphodiesterase, and the results are shown in the table which follows.

3',5'-cyclic AMP phosphodiesterase (PDE) has been isolated and purified from three different tissues in the following manner. Homogenates of beef heart and rabbit lung and kidney were made in sucrose-Tris-magnesium buffer and were subjected to centrifugation at low speed to remove nuclei and cell debris. The supernatants were then centrifuged at 105,000x g for 30 minutes. The 105,000x g supernatants were then fractionated using $(NH_4)_2SO_4$. The precipitation which formed at 0–30% saturation was collected by centrifugation at 20,000x g and dissolved in Tris-magnesium buffer and dialyzed overnight against the same buffer. A second $(NH_4)_2SO_4$ fraction was obtained by raising the concentration of the first supernatant to 50%. These two $(NH_4)_2SO_4$ fractions as well as the supernatant from the 30–50% cut were then assayed for PDE activity using the method of Appleman, Biochemistry 10, 311 (1971). The first fraction obtained from heart, lung and kidney tissues was found to contain a PDE with low affinity for 3',5'-cyclic AMP (high Km). The second fraction was found to exhibit a biphasic curve when the Lineweaver-Burk method of analysis was used. This indicates either the presence of two separate enzymes, one having a high and the other a low affinity for the enzymes, or one protein with two separate sites. Appleman, supra, indicates that extracts of brain yield two separate enzymes (a high Km and a low Km) which can be separated by sepharose gel chromatography.

All of the inhibitory studies reported here were performed with the high affinity (Fraction II, low Km) enzyme obtained from beef heart, rabbit lung and kidney. $I_{50}$ values were calculated in some instances from a plot of log I vs. percent I in experiments in which inhibitor concentration was varied over a wide range, at a constant 3,5'-cyclic AMP concentration of approximately $1.7 \times 10$ M. The relative inhibitory activity of each compound as compared with theophylline is expressed as an $\alpha$ value. This value is obtained by dividing the $I_{50}$ value for theophylline in a particular experiment by the $I_{50}$ value obtained for the particular compound being evaluated. In most instances $\alpha$ values were calculated from an inhibition study performed with a single concentration of test compound as long as the inhibition produced by that concentration was from 20–80%. In this instance an $\alpha$ value was calculated by dividing the concentration of test substance giving x% inhibition/concentration of theophylline giving the same (X%) inhibition.

The validity of this method has been checked by comparing $\alpha$ values obtained by (1) measurements at a single concentration of inhibitor and (2) measurements at four concentrations of inhibitor ($I_{50}$ determinations). $\alpha$ values compared in this way have been found to agree to within 10% of each other.

The basic incubation mixture contained the following substances (amounts in $\mu$moles): $^3$H-cAMP (specific activity ~2,180 cmp/pmole), 0.00016; Tris pH 7.5, 40; $MgCl_2$, 0.5; Enzyme (cAMP phosphodiesterase), 5–50 $\mu$g protein; and $10^{-4}$ to $10^{-6}$ molar concentration of the inhibitor; incubation time 10 minutes at 30°C. At the end of incubation the mixtures are heated to 90°C for 2 minutes and 100 $\mu$g of snake venom phosphodiesterase from *Crotalus atrox* was added and the tubes incubated for 10 minutes at 30°C. The mixture was then cooled and 1 ml of a Dowex 1-2X, 200–400 mesh suspension, prepared by mixing 100 g of the resin in 200 g $H_2O$, was added and the mixture centrifuged. An aliquot of the supernatant was used to determine counts per minute using a liquid scintillation spectrometer. Zero time values were obtained using incubations in which the cAMP phosphodiesterase was omitted from the first incubation.

6-CARBETHOXY-3,7-DISUBSTITUTEDPYRAZOLO[,5α]PYRIMIDINES
AS INHIBITORS OF 3',5'-CYCLIC AMP PHOSPHODIESTERASE (PDE)

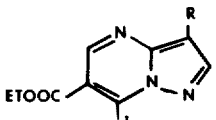

| Compound No. | R | R' | Example No. | Yield % | Mp °C | Empirical Formula | Analysis | PDE Lung; α | PDE Kidney;α | PDE Heart; α |
|---|---|---|---|---|---|---|---|---|---|---|
| 5 | H | OH | I | 37 | 298-9 dec. | $C_9H_9N_3O_3$ | M.P. | 0.5 | 0.5 | — |
| 6 | $COOC_2H_5$ | OH | I | 57 | 302-3 dec. | $C_{12}H_{13}N_3O_5$ | C,H,N | 0.6 | 0.4 | — |
| 7 | Br | OH | I | 62 | 273-5 dec. | $C_9H_8BrN_3O_3$ | C,H,N | 0.5 | 1.0 | — |
| 8 | H | $NH_2$ | II | 71 | 132-4 | $C_9H_{10}N_4O_2$ | M.P. | 0.9 | 1.0 | — |
| 9 | $COOC_2H_5$ | $NH_2$ | II | 43 | 229-33 | $C_{12}H_{14}N_4O_4$ | C,H,N | 1.5 | 2.0 | 0.7 |
| 10 | Br | $NH_2$ | II | 62 | 264-6 dec. | $C_9H_9BrN_4O_2$ | C,H,N | insol | — | — |
| 11 | $NO_2$ | $NH_2$ | II | 6 | 335-6 dec. | $C_9H_9N_5O_4$ | C,H,N | insol | — | — |
| 12 | H | Cl | III | 63 | 85-7 | $C_9H_8ClN_3O_2$ | C,H,N | 0.6 | 0.6 | — |
| 13 | H | $-OCH_2-CH_2-CH_3$ | IV | 59 | 45-7 | $C_{12}H_{15}N_3O_3$ | C,H,N | 0.6 | 0.6 | — |
| 14 | H | $-NH-CH_2-CH_3$ | V | 98 | 78-80 | $C_{11}H_{14}N_4O_2$ | C,H,N | 4.3 | 5.2 | — |
| 15 | H | $-NH-CH2-CH_2-CH_3$ | V | 71 | 60-2 | $C_{12}H_{16}N_4O_2$ | C,H,N | 5.9 | 13.0 | — |
| 16 | H | $N(C_2H_5)_2$ | V | 63 | 42-4 | $C_{13}H_{18}N_4O$ | C,H,N | 1.8 | 2.0 | 2.3 |
| 17 | H | $NH-CH_2-CH_2OH$ | V | 84 | 178-9 | $C_{11}H_{14}N_4O_3$ | C,H,N | 1.5 | 0.3 | — |
| 18 | H | $NH-CH_2-COOH$ | VI | 76 | 279-81 dec. | $C_{11}H_{12}N_4O_4$ | C,H,N | 1.7 | 1.2 | — |
| 19 | H | $NHN(CH_3)_2$ | V | 87 | 129-30 | $C_{11}H_{15}N_5O_2$ | C,H,N | 2.0 | 1.1 | — |
| 20 | H | SH | VII | 97 | 208-10 | $C_9H_9N_3O_3S$ | C,H,N | 2.0 | 1.0 | 1.2 |
| 21 | H | $S-CH_2-CH_3$ | VIII | 37 | 40-1 | $C_{11}H_{13}N_3O_2S$ | C,H,N | 4.3 | 0.8 | — |
| 22 | Br | $-OCH_2-CH_2-CH_3$ | IX | 48 | 127-9 | $C_{12}H_{14}BrN_3O_3$ | C,H,N | 2.7 | 1.8 | — |
| 23 | Br | $NH-CH_2-CH_3$ | IX | 60 | 108-10 | $C_{11}H_{13}BrN_4O_2$ | C,H,N | 4.0 | 8.0 | — |
| 24 | Br | $NH-CH_2-CH_2-CH_3$ | IX | 95 | 77-9 | $C_{12}H_{15}BrN_4O_2$ | C,H,N | 6.0 | 7.2 | — |
| 25 | Br | $N(CH_2-CH_3)_2$ | IX | 81 | 58-60 | $C_{13}H_{17}BrN_4O_2$ | C,H,N | 6.0 | 6.0 | 3.5 |
| 26 | Br | $NH-CH_2-CH_2OH$ | IX | 96 | 171-3 | $C_{11}H_{13}BrN_4O_3$ | C,H,N | 1.3 | 3.1 | — |
| 27 | Br | $NH-CH_2-COOH$ | IX | 77 | 262-4 | $C_{11}H_{11}BrN_4O_4$ | C,H,N | 2.4 | 1.5 | 2.6 |
| 28 | Br | $NH-N(CH_3)_2$ | IX | 51 | 175-7 dec. | $C_{11}H_{14}BrN_5O_2$ | C,H,N | insol | — | — |
| 29 | Br | $S-CH_2-CH_3$ | IX | 54 | 84-6 | $C_{11}H_{13}BrN_3O_2S$ | C,H,N | 3.0 | 4.1 | 10.0 |

Analysis of the results set forth in the foregoing table show that several of the compounds of this invention possess inhibition capability superior to theophylline. Such results also indicate that these compounds possess selective phosphodiesterase enzyme inhibitory capability.

Preliminary pharmacological evaluation of 7-amino-3-bromo-6-carbethoxypyrazolo[1,5a]pyrimidine (compound 10) reveals that this compound possesses significant immunosuppressive properties when administered subcutaneously to mice at a dose of 100 mg/kg. This compound also possesses the ability to bring about coronary dialation at a concentration of 0.5 mcg/ml in an isolated guinea pig heart preparation. Other cardiotropic properties (absence of chronotropic and inotropic effects) were not observed even at concentrations of twenty times the minimum dialator concentration.

Additional pharmacological evaluation revealed that 6-carbethoxy-7-ethylaminopyrazolo[1,5a] pyrimidine (compound 14) and 3-bromo-6-carbethoxy-7-propylaminopyrazolo[1,5a]pyrimidine (compound 24) are smooth muscle relaxants as evidenced by their ability to relax isolated guinea pig uteri at concentrations of 10 mcg/ml.

Evaluation of N-(6-carbethoxypyrazolo[1,5a]pyrimidin-7-yl)glycine (compound 18) revealed that this compound possesses the ability to bring about coronary dilation at a concentration of 5 mcg/ml in the absence of other cardiotropic properties (isolated guinea pig heart preparation).

Compound 9 (7-amino-3,6-dicarbethoxypyrazolo[1,5a]pyrimidine) has demonstrated a positive inotropic effect at a concentration of 10 mcg/ml in the isolated guinea pig heart preparation.

6-carbethoxy-7-(β-hydroxyethylamino)pyrazolo[1,5a]pyrimidine (compound 17) prevented anaphylactic death when administered orally to mice at 100 mg/kg in the absence of antihistaminic or antiserotomin properties.

Eleven of these derivatives have been evaluated for their ability to inhibit ADP induced platelet aggregation. This evaluation was carried out in vitro following the procedure of G.V.R. Born and M. J. Cross as described in J. Physiol., 168, 178 (1963). The results of these evaluations, as well as a comparison with the standard adenosine, is shown in Table II.

6-CARBETHOXY-3,7-DISUBSTITUTEDPYRAZOLO[1,5a]PYRIMIDINES AS INHIBITORS OF ADP INDUCED PLATELET AGGREGATION

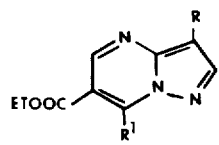

| Compound | R | R' | Conc. mcg/ml | %Inhibition |
|---|---|---|---|---|
| Adenosine | | | 100 | 64 |
| 5 | H | OH | 100 | 70 |
| | | | 50 | 33 |
| 6 | COOC$_2$H$_5$ | OH | 100 | 68 |
| | | | 50 | 23 |
| 7 | Br | OH | 100 | 88 |
| | | | 50 | 34 |
| 8 | H | NH$_2$ | 100 | 94 |
| | | | 50 | 50 |
| 9 | COOC$_2$H$_5$ | NH$_2$ | 100 | 86 |
| | | | 50 | 47 |
| 10 | Br | NH$_2$ | 100 | 68 |
| | | | 25 | 67 |
| | | | 12.5 | 31 |
| 14 | H | —NH—CH$_2$—CH$_3$ | 100 | 86 |
| | | | 50 | 42 |
| 17 | H | NH—CH$_2$—CH$_2$OH | 100 | 92 |
| | | | 50 | 47 |
| 18 | H | NH—CH$_2$—COOH | 100 | 72 |
| | | | 50 | 67 |
| | | | 25 | 14 |
| 23 | Br | NH—CH$_2$—CH$_3$ | 100 | 77 |
| | | | 50 | 49 |
| 24 | Br | NH—CH$_2$—CH$_2$—CH$_3$ | 100 | 50 |
| 26 | Br | NH—CH$_2$—CH$_2$OH | 100 | 72 |
| | | | 50 | 42 |

We claim:

1. 6-Carbethoxy-7-ethylamino-pyrazolo[1,5a]pyrimidine.

2. 3-Bromo-6-carbethoxy-7-propylaminopyrazolo[1,5a]pyrimidine.

3. 3-Bromo-6-carbethoxy-7-(β-hydroxyethylamino)-pyrazolo[1,5-a]pyrimidine.

* * * * *